United States Patent [19]
Baca et al.

[11] Patent Number: 5,541,897
[45] Date of Patent: Jul. 30, 1996

[54] MULTI-CAROUSEL LIBRARY WITH DOUBLE DISK RECEPTACLES AND SINGLE DISK RETAINER

[75] Inventors: Francisco A. Baca; Robert L. Bingham; Chi-Hung Dang; Chi-Thanh Dang; Zara F. Hudson, all of Tucson, Ariz.

[73] Assignee: International Business Machines Corporation, Armonk, N.Y.

[21] Appl. No.: 259,218

[22] Filed: Jun. 13, 1994

[51] Int. Cl.$^6$ ............................ G11B 17/22; G11B 17/26
[52] U.S. Cl. ............................... 369/37; 369/36; 369/194
[58] Field of Search ................................. 369/37, 36, 39, 369/191, 194; 360/98.05, 98.06, 92

[56] References Cited

U.S. PATENT DOCUMENTS

| | | | |
|---|---|---|---|
| 2,159,833 | 5/1939 | Smyth | 274/10 |
| 2,658,761 | 11/1953 | Morris | 274/10 |
| 4,278,258 | 7/1981 | Fujita et al. | 369/36 |
| 4,644,515 | 2/1987 | Allebest et al. | 369/32 |
| 4,670,866 | 6/1987 | Hasegawa et al. | 369/36 |
| 4,730,292 | 3/1988 | Hasegawa et al. | 369/39 |
| 5,146,451 | 9/1992 | Kang | 369/37 |
| 5,291,465 | 3/1994 | Dennis | 369/37 |

FOREIGN PATENT DOCUMENTS

| | | |
|---|---|---|
| 59-177759 | 10/1984 | Japan . |
| 62-289960 | 12/1987 | Japan . |
| 4-177660 | 6/1992 | Japan . |
| 1508972 | 12/1973 | United Kingdom . |

*Primary Examiner*—Stuart S. Levy
*Assistant Examiner*—Kevin M. Watkins
*Attorney, Agent, or Firm*—Baker, Maxham, Jester & Meador

[57] ABSTRACT

A double storage multi-carousel recordable media library is provided which includes a plurality of vertically stacked carousels mounted for rotation about a vertically extending central axis. Each carousel has a plurality of receptacles which are angularly spaced about the central axis, each receptacle being capable of storing a pair of recordable media disks. Each carousel has a large peripheral cutout which is located between a pair of receptacles for allowing passage of the disks and each receptacle has a smaller peripheral cutout for allowing movement of a transport device. Each carousel cutout is capable of alignment along a transport axis which is parallel to the central axis so that a disk can be transported vertically therealong. A disk chucking device is mounted for receiving and releasably retaining disks which are moved vertically along the transport axis. A transport device is movable vertically along the transport axis and can pass through any receptacle cutout for removing a pair of disks from a receptacle when the receptacle is aligned with the transport axis. A drive device may be mounted on the transport device for processing a bottom side of either one of the disks. If the bottom disk is to be processed, both disks stay on the transport/drive device. If the top disk is to be processed, it is temporarily chucked out the top of the library while the bottom disk is rotated out of the way. The transport/drive device then retrieves the top disk for processing. By a special mechanical arrangement, the carousels can be accurately positioned for processing the disks even though the carousels are rotated by ordinary motors.

30 Claims, 14 Drawing Sheets

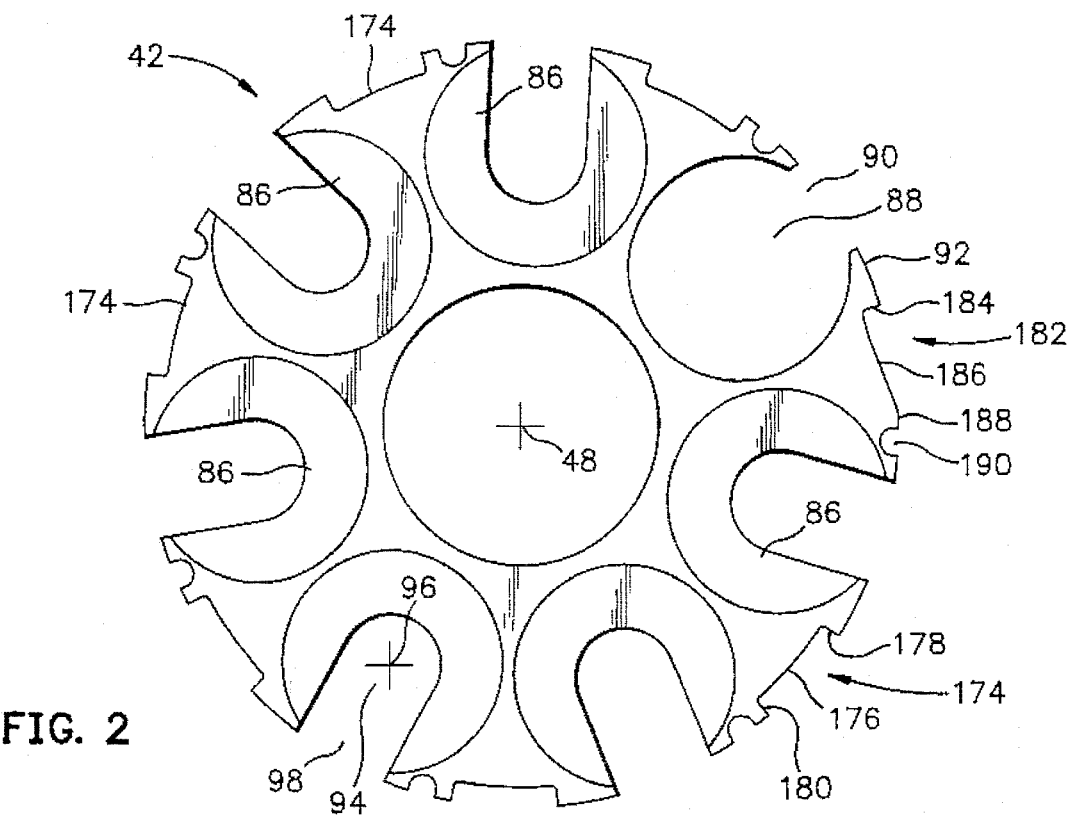
FIG. 2
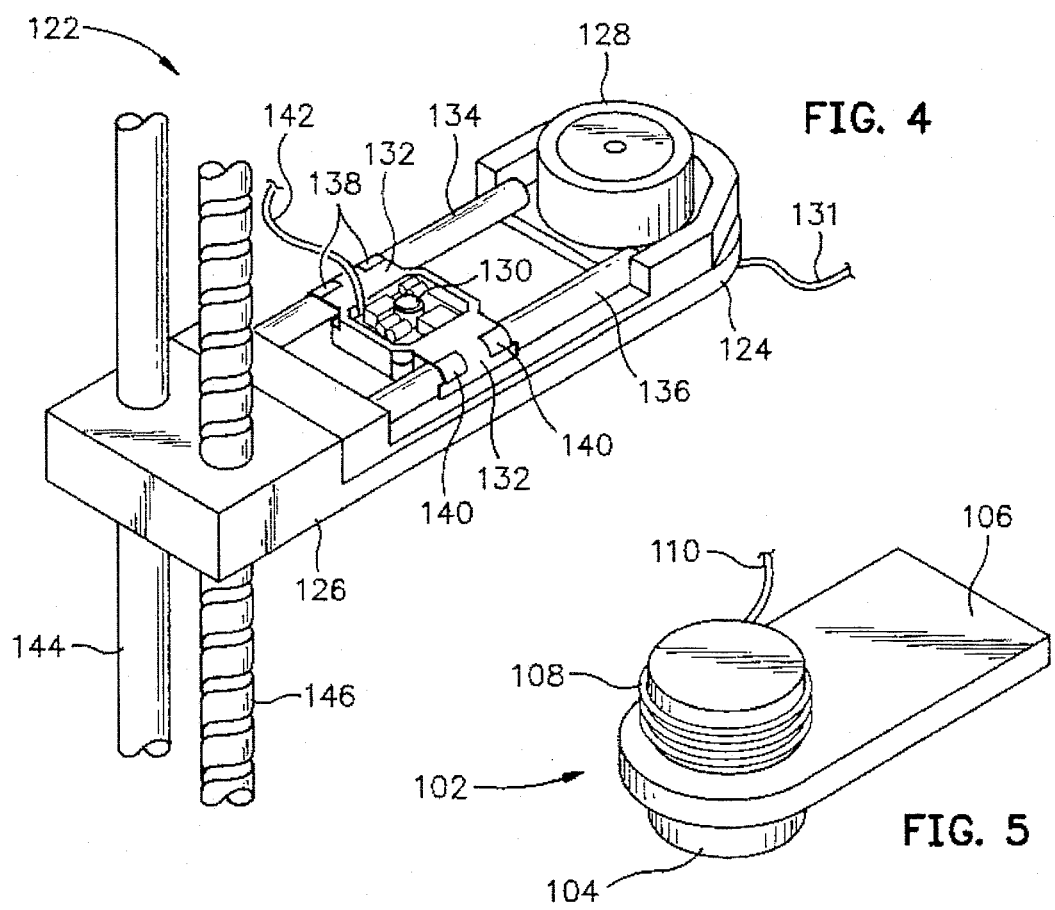
FIG. 4
FIG. 5

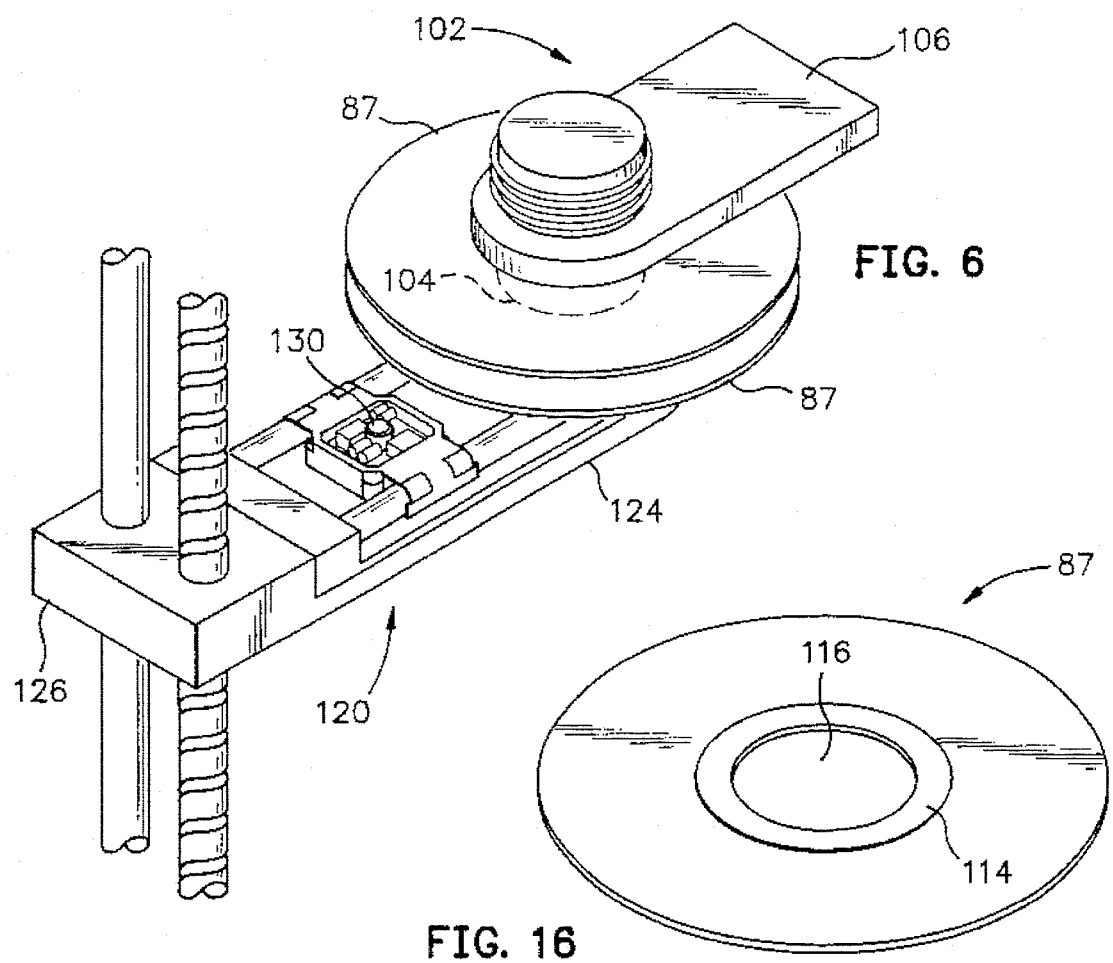
FIG. 6
FIG. 16
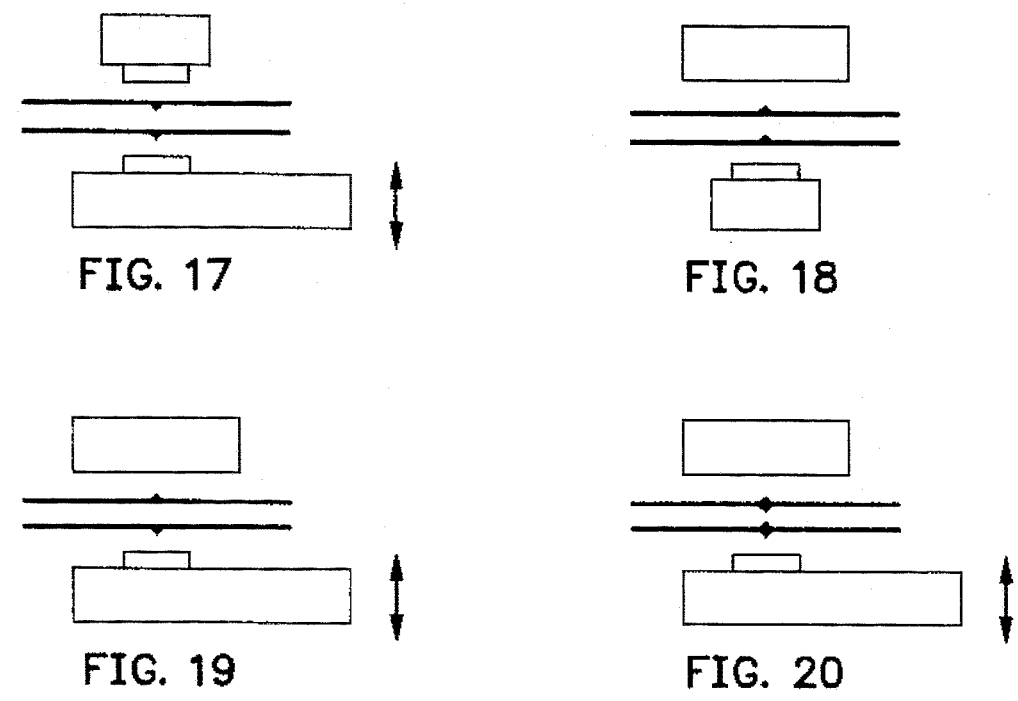
FIG. 17
FIG. 18
FIG. 19
FIG. 20

MULTI-CAROUSEL LIBRARY WITH DOUBLE DISK RECEPTACLES AND SINGLE DISK RETAINER

BACKGROUND OF THE INVENTION

1. Field of the Invention

The present invention relates to a multi-carousel library which has its disk capacity doubled by a unique transport, disk retention device and drive combination.

2. Description of the Related Art

Considerable effort has been made to increase the areal density of storage media, such as magnetic tape and magnetic and optical disks. The read and write heads for magnetic media have been made extremely small by the use of thin film technology. Write heads with a 2–3 μm track width have been proven and submicron track widths appear to be feasible. With the same technology, read heads are fabricated to read narrower than the written track. The track density of a magnetic head is quantified as tracks per inch ("TPI"). Write heads are also made with a very narrow gap, in the order of 0.3 μm, so that the linear density of the head is maximized. This will determine the number of bits per inch ("BPI") written into the magnetic medium as it moves relative to the magnetic head. The product of the tracks per inch density and the linear density is known as the areal density of a head. Areal densities in the order of 1 gigabyte per square inch are now feasible.

While the areal density of recordable media is remarkably high, the libraries which store the media are spatially non-compact. Consequently, in a data storage library the spatial density of stored data can be quite low. A typical data storage library includes a track and trolley combination which carries a cartridge or disk picker for removing or replacing cartridges from place to place within the library. This generally requires two tracks, one along the full length of the library and one along the height of the library. A more sophisticated data storage library includes a robotic arm which may be selectively positioned anywhere within the library for removal or replacement of recordable media cartridges.

A significant improvement in spatial density of stored data was realized by the use of a multi-carousel library. In such a library, the carousels are vertically stacked for independent rotation about a central axis. Each carousel has a plurality of receptacles which are angularly spaced from one another about the central axis for storing the recordable media. A picker operates adjacent the peripheries of the carousels for transporting storage media from the various receptacles to an external drive device. A commonly assigned application on such a library entitled "Sub-Carousel Data Storage Library" was filed on Apr. 16, 1993, Ser. No. 08/048,437, which is incorporated by reference herein. In the previously filed multi-carousel storage library, each receptacle stored only one storage medium. It would be desirable if this capacity could be doubled while still maintaining the multi-carousel concept.

SUMMARY OF THE INVENTION

The present invention doubles the storage capacity of a multi-carousel disk storage library. This has been accomplished by a unique combination of elements. A disk transport device and a disk drive are operable within the boundary of the multi-carousel library. Each carousel is provided with a peripheral cutout located between a pair of receptacles, and each receptacle is provided with a peripheral cutout. Each carousel cutout is capable of alignment along a transport axis which is parallel to the central axis of rotation of the carousels. The carousel cutout is large enough to allow a disk to be transported vertically along the transport axis. Transport of the disk is full-range when all of the carousel cutouts are aligned along the transport axis. A transport device is provided which moves vertically along the transport axis and which is passable through any receptacle cutout when a disk is moved into the transport access location. At the top of the multi-carousel library, a disk chucking device is provided for receiving and releasably retaining a disk moved vertically to it by the transport device. The transport device preferably includes a drive for reading and writing the disk. When two disks are placed in each receptacle, the transport device can move both disks up to the disk chucking device where one disk is retained while the remaining disk is lowered by the transport device back to its original receptacle. This receptacle is then rotated out of the way and the transport device returns to the disk chucking device where the disk is released so it can be read or written by the drive device. The operation is reversed to return both disks to the original receptacle. Both disks are placed in the receptacle with their recordable side facing downwardly. If the bottom disk is to be processed instead of the top disk, then both disks are left on the transport device and rotated while the read and write heads process the bottom disk. With this arrangement, two disks can be stored in each receptacle of each carousel and can be selectively processed. This doubles the normal capacity of the multi-carousel library.

An object of the present invention is to increase the storage capacity of a recordable media library.

Another object is to double the storage capacity of a multi-carousel library.

A further object is to provide a recordable media storage library wherein a pair of recordable media disks can be stored within a single receptacle instead of one.

Yet another object is to accomplish the aforementioned objects as well as precisely positioning the carousels of a multi-carousel library so that processing of recordable media can be accomplished within the boundary of the library.

Other objects and advantages will become apparent when considered in light of the following description of the invention.

BRIEF DESCRIPTION OF THE DRAWINGS

FIG. 2 is a planar illustration of one of the carousels of the present invention, with all recordable media disks removed.

FIG. 4 is an isometric illustration of a combined transport and drive device movable vertically on a post.

FIG. 5 is an isometric illustration of a disk chucking device.

FIG. 6 is an isometric view of the combined transport and drive device delivering a disk to the disk chucking device with the top disk chucked by the disk chucking device.

FIG. 16 is an isometric view of a recordable media disk.

FIGS. 17–20 are schematic illustrations of different arrangements for processing a pair of disks relative to a carousel receptacle.

DESCRIPTION OF THE PREFERRED EMBODIMENTS

Figure 1:
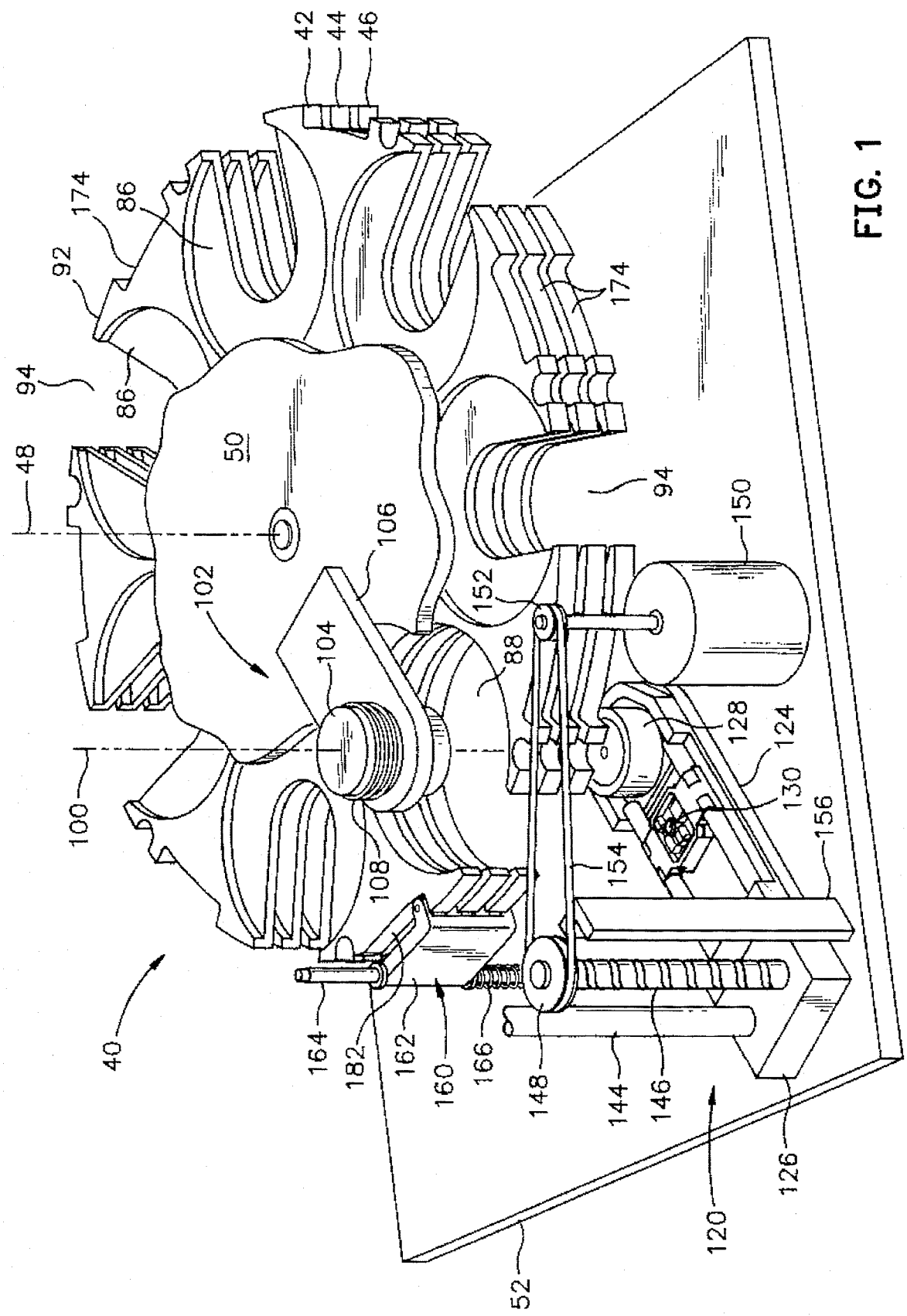
FIG. 1 is an isometric illustration of the present invention with all recordable media disks removed.

Referring now to the drawings, wherein like reference numerals designate like or similar parts throughout the several views, there is illustrated in FIG. 1 a multi-carousel recordable media library 40 which has a double storage capacity. Three vertically stacked carousels 42, 44, and 46 are mounted to a framework, shown in FIG. 3, for independent rotation about a vertically extending central axis 48. The carousels, which will be described in more detail hereinafter, are shown in FIGS. 1–3 with the recordable media, such as magnetic or optical disks, removed.

Figure 3:
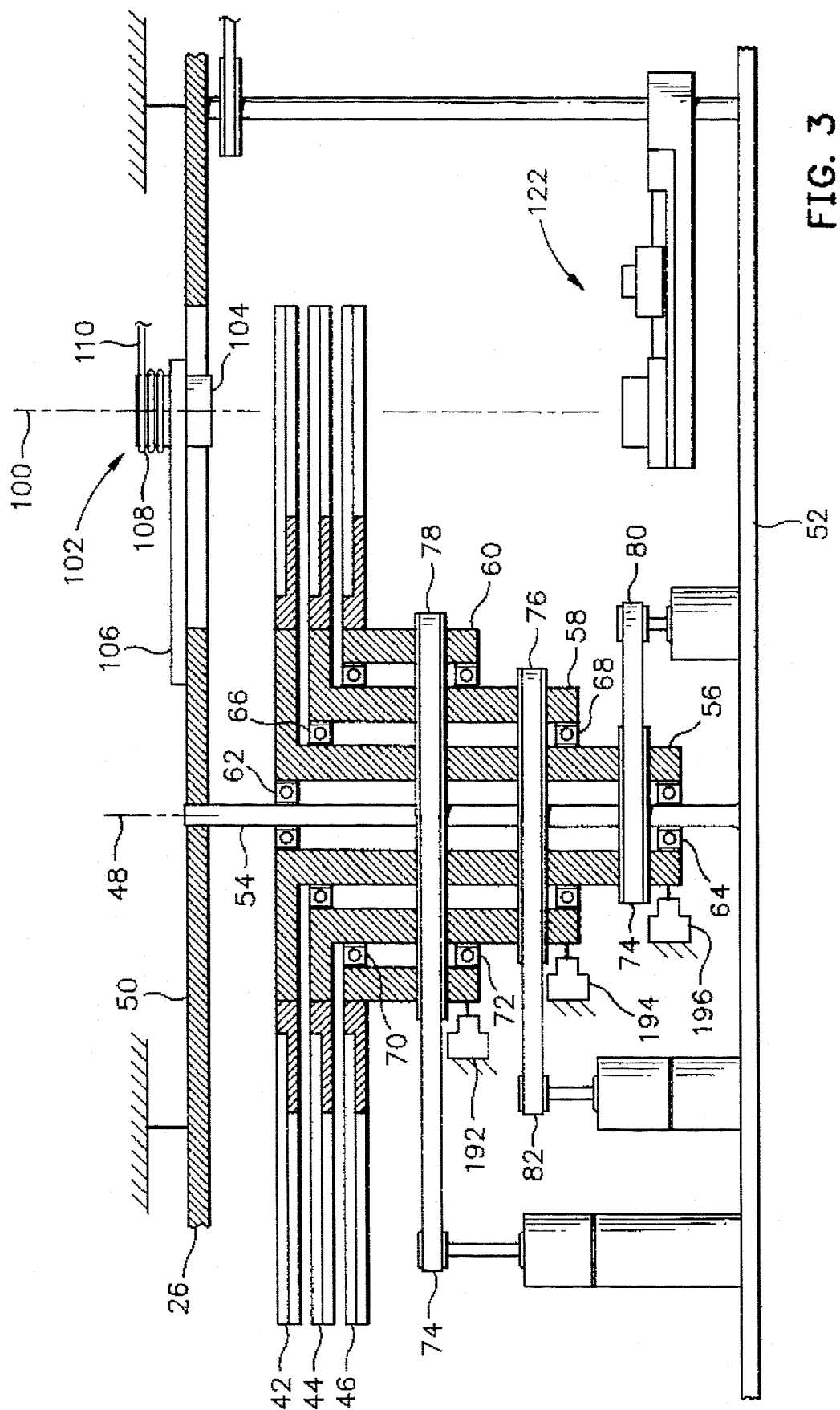
FIG. 3 is a side view of the multi-carousel library shown partially in cross-section.

The arrangement for mounting and independently rotating the carousels in shown in FIG. 3. A framework is provided which may include a top plate 50 and a base plate 52, both of these plates being interconnected (not shown). A central shaft 54 is provided which vertically extends along the central axis 48, the central shaft 54 being fixed in place by connection to the top and bottom plates 50 and 52. The carousels 42, 44, and 46 are radially connected to hollow shafts 56, 58, and 60, respectively, which are concentric with respect to each other and the central shaft 54. The hollow shaft 56 and its carousel 42 are rotatably mounted to the central shaft 54 via roller bearings 62 and 64. The hollow shaft 58 and its carousel 44 are rotatably mounted to the hollow shaft 56 by top and bottom roller bearings 66 and 68. The hollow shaft 60 and its carousel 46 are rotatably mounted to the hollow shaft 58 by top and bottom roller bearings 70 and 72. Bottom portions of the hollow shafts 56, 58, and 60 are provided with pulleys 74, 76, and 78. A motor and belt combination 80 operates on the pulley 74 to rotate the top carousel 42, a motor and belt combination 82 operates on the pulley 76 to operate the middle carousel 44, and a motor and belt combination 84 operates on the pulley 78 to operate the bottom carousel 46. These motors, which may be stepping motors, are operated as desired to independently rotate any one or a combination of the carousels 42, 44, and 46.

FIG. 2 is a planar illustration of carousel 42 which is the same as carousels 44 and 46. The carousel 42 has a plurality of receptacles 86 which are angularly spaced from one another about the central axis 48. Each receptacle is capable of supporting a pair of recordable media disks, such as optical disks 87 (see FIG. 4). Each carousel has a large semi-circular shaped cutout 88 which is located between a pair of receptacles 86. The semi-circular opening of the carousel cutout 88 is larger than the circular periphery of a recordable media disk. Further, the carousel cutout 88 has a peripheral opening 90 at a rim 92 of the carousel for a purpose to be explained hereinafter.

Each receptacle 86 is also provided with a smaller cutout 94 which extends radially inward toward the central axis 48 beyond a center 96 of a recordable media disk when it is stored in the receptacle 86. Each receptacle cutout 94 also has a peripheral opening 98 at the rim of the carousel which is substantially the same width as the opening 90 of the larger cutout 88. The cutout 94 leaves the respective receptacle 86 with a curved ledge for adequately supporting a pair of recordable media disks.

As shown in FIG. 1, each carousel cutout 88 is capable of alignment along a transport axis 100, which is parallel to the central axis 48. When this occurs, a disk can be transported vertically along the transport axis. The range of transportation of a disk increases as more carousel cutouts are aligned along the transport axis 100. When all of the carousel cutouts 88 are aligned as shown in FIG. 1, a disk can be transported vertically completely through the vertical height of the carousels 42, 44, and 46. The details of the disk and its transportation along the transport axis 100 will be described in more detail hereinafter.

As shown in FIG. 1, 3, and 5, a disk chucking apparatus 102 is provided at the top of the carousel library. This apparatus includes a spindle 104 for receiving the central aperture of a recordable media disk. The spindle 104 is fixedly connected to the top plate 50 of the library by a laterally extending plate 106. A longitudinal axis of the spindle is co-extensive with the transport axis 100. A portion of the spindle may extend above the plate 106 and may be improvised as an electromagnet by windings 108. Accordingly, when the windings 108 are energized via a wire 110, a metallic recordable media disk can be retained against the plate 106. When the windings 108 are de-energized, the recordable media disk is released from the plate 106. If a pair of metallic recordable media disks are transported to the spindle 102, the amount of energization of the windings via the wire 110 can be designed so that only the top recordable media disk is retained. When the windings 108 are de-energized, the recordable media disk is released from the spindle 102. With this arrangement, magnetic disks will not have to be modified, since they are metallic. However, if an optical disk 87 is employed, as illustrated in FIG. 16, the top optical disk of each pair of disks in a carousel receptacle is provided with a metallic ring 114 adjacent its central opening 116. This ring 114, which may be a press-on thin film, would then be magnetically attracted by the electromagnet of the spindle 102.

A transport apparatus is generally shown at 120 in FIG. 1 for vertically transporting recordable media disks along the transport axis 100. The movable part of the transport apparatus 120 is shown generally at 122 in FIG. 4. The movable part 122 may include a radially extending plate 124 which is connected to a block 126. The plate 124 rotatably supports a spindle 128 which receives a central opening of a recordable media disk for rotating the disk above an optical head 130. The spindle 128 may be rotated by a motor (not shown) below the plate which is activated by a wire 131. The optical head 130 is mounted on a trolley 132 which rides on a pair of laterally spaced apart rails 134 and 136. Each of the rails 134 and 136 is a bar magnet. The trolley 132 has coils 138 and 140 which circumscribe the rails 134 and 136, respectively, for inducing a field into the rails. Depending upon the amount of energization of these coils 138 and 140, via wiring 142, the trolley 132 is selectively moved toward and away from the spindle 128 for optically reading the bottom side of an optical disk. If magnetic disks are employed instead of optical disks 87, the optical head 130 would be replaced with a magnetic head appropriate for reading and writing the bottom of the disk.

As can be seen from FIG. 1, the block 126 slidably receives a vertical post 144 which is fixedly connected at its bottom (not shown) to the base plate 52. The block 126 has an internal worm gear (not shown) for threadably receiving a vertically extending external worm gear 146, the top of which is provided with a pulley 148. A motor 150, which is mounted to the plate 52, is provided with a pulley 152 and a belt 154 for rotating the worm gear 146 via the pulley 148. Accordingly, by selectively operating the motor in one of two directions, the block 126 can be moved up and down outside the peripheries of the carousels 42, 44, and 46. In order to stabilize the movement of the block 126, a vertically extending post 156 may be fixed to the plate 52 in slidable contact with one end of the block 126. When the block 126 is moved up and down, the plate 124 along with its spindle 128 and optical head 130 are moved up and down within either the large carousel cutouts 88 or the smaller receptacle cutouts 94. This is accomplished because the width of the plate 124 in FIG. 4 is less than the peripheral openings 90 and 98 of the cutouts 88 and 94 as shown in FIG. 2. This is important from the standpoint that when either large cutouts 88 and/or smaller cutouts 94 are aligned along the transport axis 100 (see FIG. 1), the transport apparatus 120 can operate freely in either an up direction or a down direction along the transport axis 100. This will enable the transport apparatus 120 to transport disks from a receptacle located along the transport axis 100 to the spindle 102 (see FIG. 3) and vice versa, which will be described in more detail hereinafter.

It is desirable that the carousel cutouts 88 and/or the receptacle cutouts 94 be accurately aligned with the transport axis 100. This will enable the laterally extending plate 124 of the transport apparatus 120 and the recordable media disks to move along the transport axis 100 without crashing into misaligned carousels 42, 44, and 46. In the past, this accurate positioning required complex circuitry which is expensive. The present invention provides a mechanical arrangement which greatly simplifies precise positioning of the carousels 42, 44, and 46. This mechanical arrangement is shown primarily in FIGS. 1 and 2. In FIG. 1, there is shown a spring-biased detent 160 which is capable of engaging the rims 92 of the carousels 42, 44, and 46. The detent 160 may include an arm 162 which is rotatably mounted to the base 52 by a vertically extending post 164. A coil spring 166 about a bottom portion of the post may be connected to the plate and the bottom of the arm 162 for biasing the detent toward the peripheries of the carousels 42, 44, and 46. Spaced from the post 164, the arm 162 is provided with top and bottom inwardly extending flanges 168 and 170 (see FIG. 7) which may rotatably mount a plurality of rollers 172, each roller rolling on a respective rim 92 of a carousel 42, 44, 46.

As shown in FIGS. 1 and 2, the rim 92 of each carousel 42, 44, and 46 is generally circular and is coaxial with the central axis 48. Each rim is provided with a plurality of recesses 174. Each recess 174 is generally located between a pair of receptacles 86, however, each recess 174 corresponds to a particular receptacle 86, depending on which way the carousel is rotated. In the present embodiment, the carousels 42, 44, and 46 are normally rotated clockwise looking down the central axis 48 of FIG. 1, with the exception of one instance which will be explained hereinafter. Assuming a clockwise rotation, the recess 174 to the immediate clockwise (downstream) direction of a receptacle 86 will be its corresponding recess. This is because the detent 160 in FIG. 1 will be acting within that recess for positioning a corresponding receptacle along the transport axis 100 which will be explained in more detail hereinafter. As shown by the bottom recess 174 (with an arrow) in FIG. 2, each recess has an inward surface 176, which is bounded in part by an upstream stop surface 178. The inward surface 176 may be semi-circular about the central axis 48 and the stop surface 178 may extend radially from the central axis 48. A similar stop surface 180 may be provided within the recess 174 at a downstream location. Accordingly, when the detent 160 is biased into a recess 174, it will stop clockwise rotation of the carousel when the detent engages the upstream stop surface 178. The distance between the stop surfaces 178 and 180 provides a range within which the detent 160 may operate, for a purpose to be explained in detail hereinafter.

One of the peripheral recesses of each carousel 42, 44, and 46 is a ramp recess 182, as seen in FIG. 2. The ramp recess 182 is located in the periphery 92 of the carousel immediately clockwise (downstream) from the carousel cutout 88. The ramp recess 182 has an upstream stop 184 which is the same kind of stop as 178 for the recesses 174. A ramp surface 186 extends downstream from the upstream stop surface 184 of the recess 182 to a rim portion of the carousel shown at 188. When a carousel is rotated counterclockwise, the detent shown in 160 is cammed out of the recess 182 onto the rim portion 188. The arcuate length of the rim portion 188 is sufficient to support the detent in an outward unlocked position with respect to all of the other recesses 174. Should a malfunction occur and the detent go past the rim portion 188, an indentation 190 is provided in the rim of each carousel adjacent a respective rim portion 188 immediately upstream thereof when the carousel is being rotated counterclockwise. This will cause the detent to drop into the indentation 190 and prevent it from damaging disks located in the adjacent receptacle.

It can be visualized from FIG. 1 that if one of the carousels 42, 44, or 46 is rotated counterclockwise, the detent 160 will ride up the ramp 186 of FIG. 2 to rest upon the peripheral portion 188. This unlocks the detent from the recesses 174 of the other two carousels. Assuming that the top carousel is rotated counterclockwise to cam open the detent, the other carousels 44 and 46 are free to rotate one of their receptacles 86 into alignment with the transport passageway 100. This will be done when it is desired to transport a pair of disks from the aligned receptacle for processing. After processing, the disks can be returned to the receptacle. The receptacle is then rotated to its original position, and the top carousel is rotated clockwise to allow the detent 160 to ride back to the stop position 92, as seen in FIG. 1.

As stated hereinabove, the carousels are rotated to their desired positions by the motors 80, 82, and 84, shown in FIG. 3. It is difficult for motors by themselves to accurately position the carousels. This is why the recesses 174 shown in FIG. 2 have a distance between their upstream and downstream stops 178 and 180. This distance is sufficient so that the detent can be dropped (released from its cammed open position) into these recesses somewhere between the upstream and downstream stop positions. The drop time is accomplished by optical sensors 192, 194, and 196. The optical sensors 192, 194, and 196 are fixedly mounted on the base plate 52 facing lower peripheral ends of the hollow shafts 60, 58, and 56, respectively. These hollow shafts are provided with markings (not shown) which are read by the optical readers to tell the motors 80, 82, and 84 via wire connections (not shown) when to turn on and when to turn off. By use of the optical readers 192, 194, and 196, the motors can easily position the recesses 174 so that the detent 160 will be located intermediate its upstream and downstream stops 178 and 180. For instance, after gross positioning of either carousel 44 or 46 by its corresponding optical reader, the top carousel is rotated clockwise until the detent leaves the flat 188 and engages the upstream stop 184 of the ramp recess 182. The detent now engages the bottom portion 176 of the selected recess 174. The carousel 44 or 46 is then rotated clockwise until the detent engages the upstream stop 178 of the recess which accurately positions all of the carousels as desired. This complete operation is next explained in regard to FIGS. 7–15.

Figure 7:
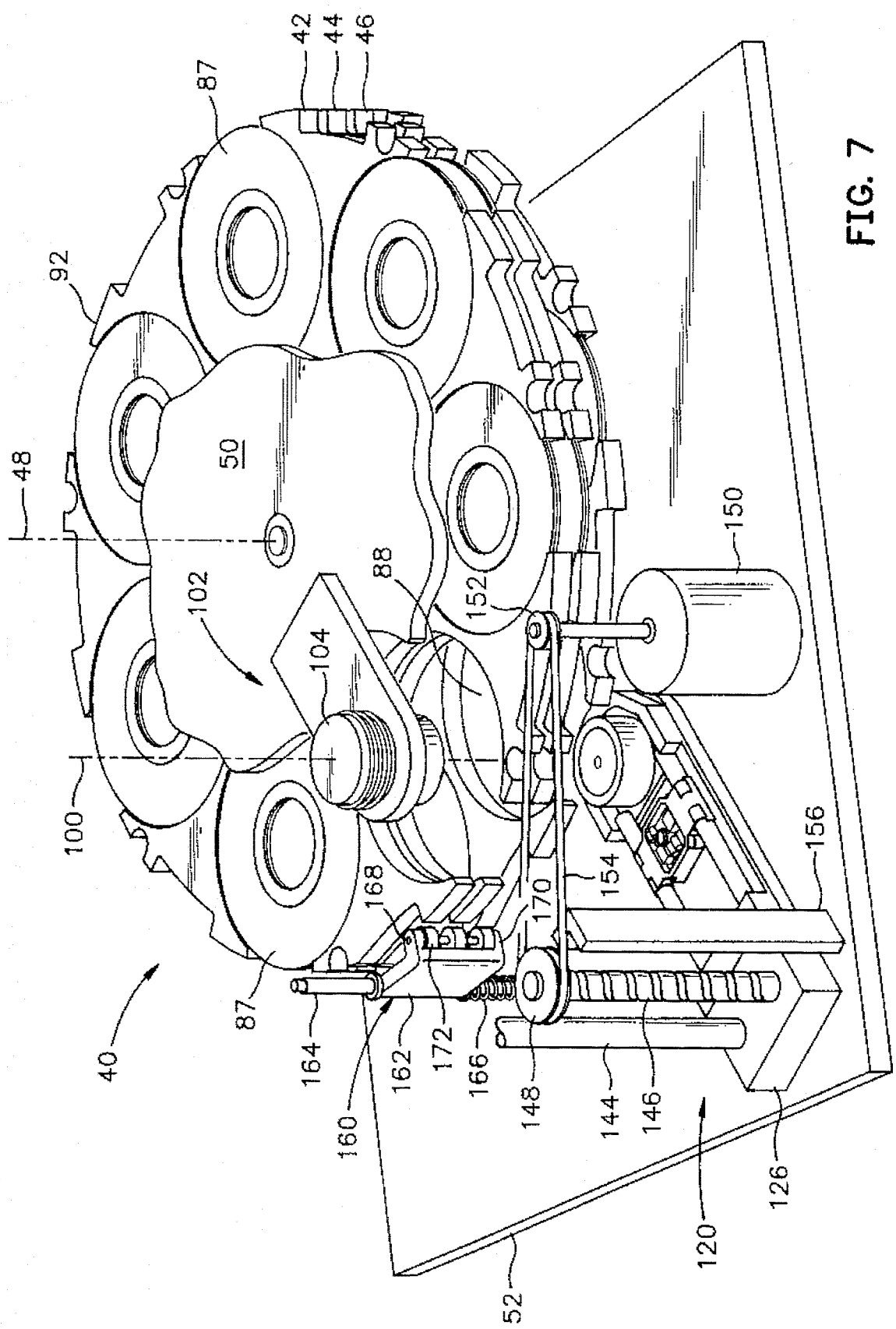
FIG. 7 is an isometric illustration of the multi-carousel library loaded with disks and the bottom carousel rotated counterclockwise to cam open a detent.
Figure 8:
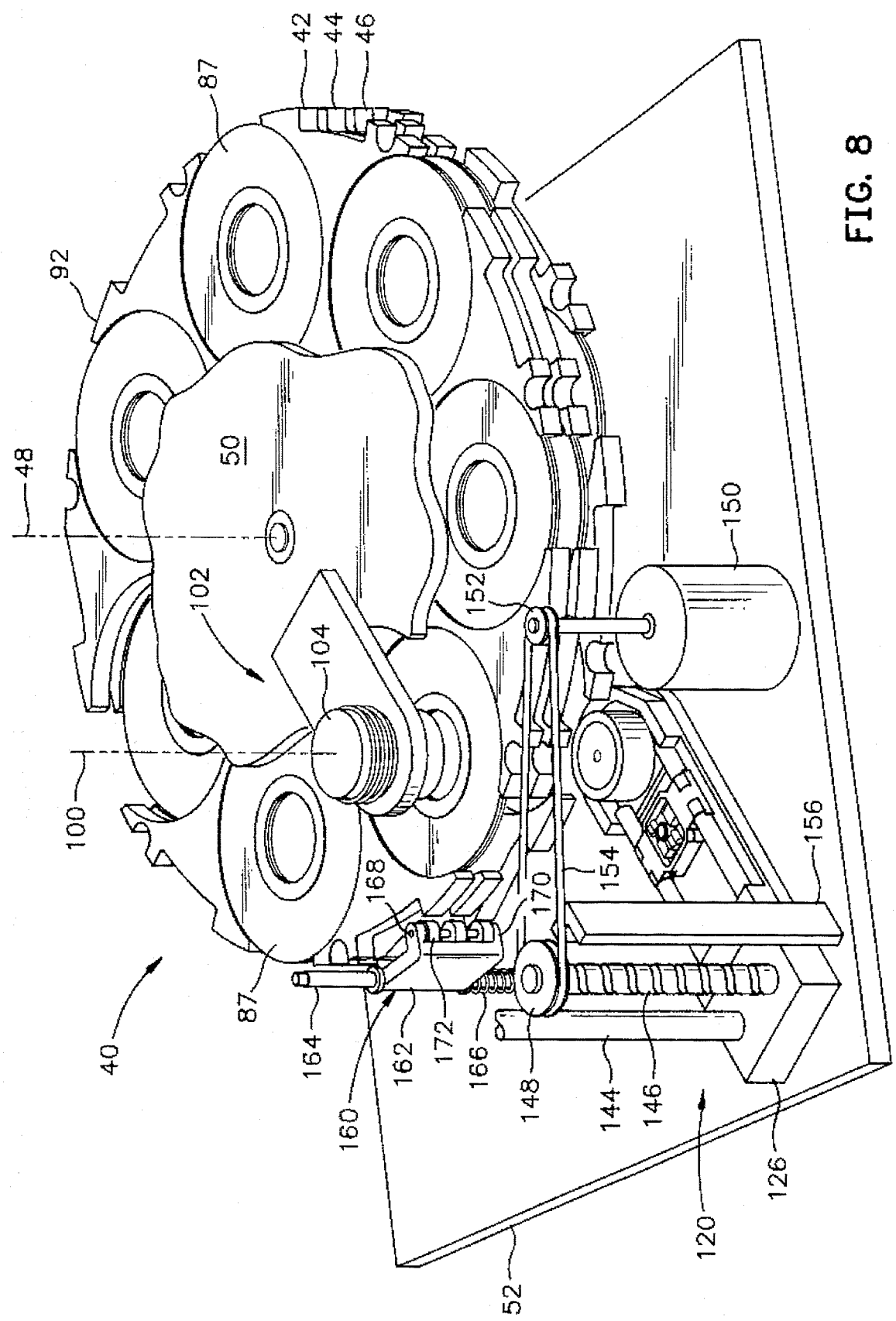
FIG. 8 is the same as FIG. 7 except the top carousel has been rotated clockwise to place a pair of disks in a transport passageway for processing one of the disks.
Figure 9:
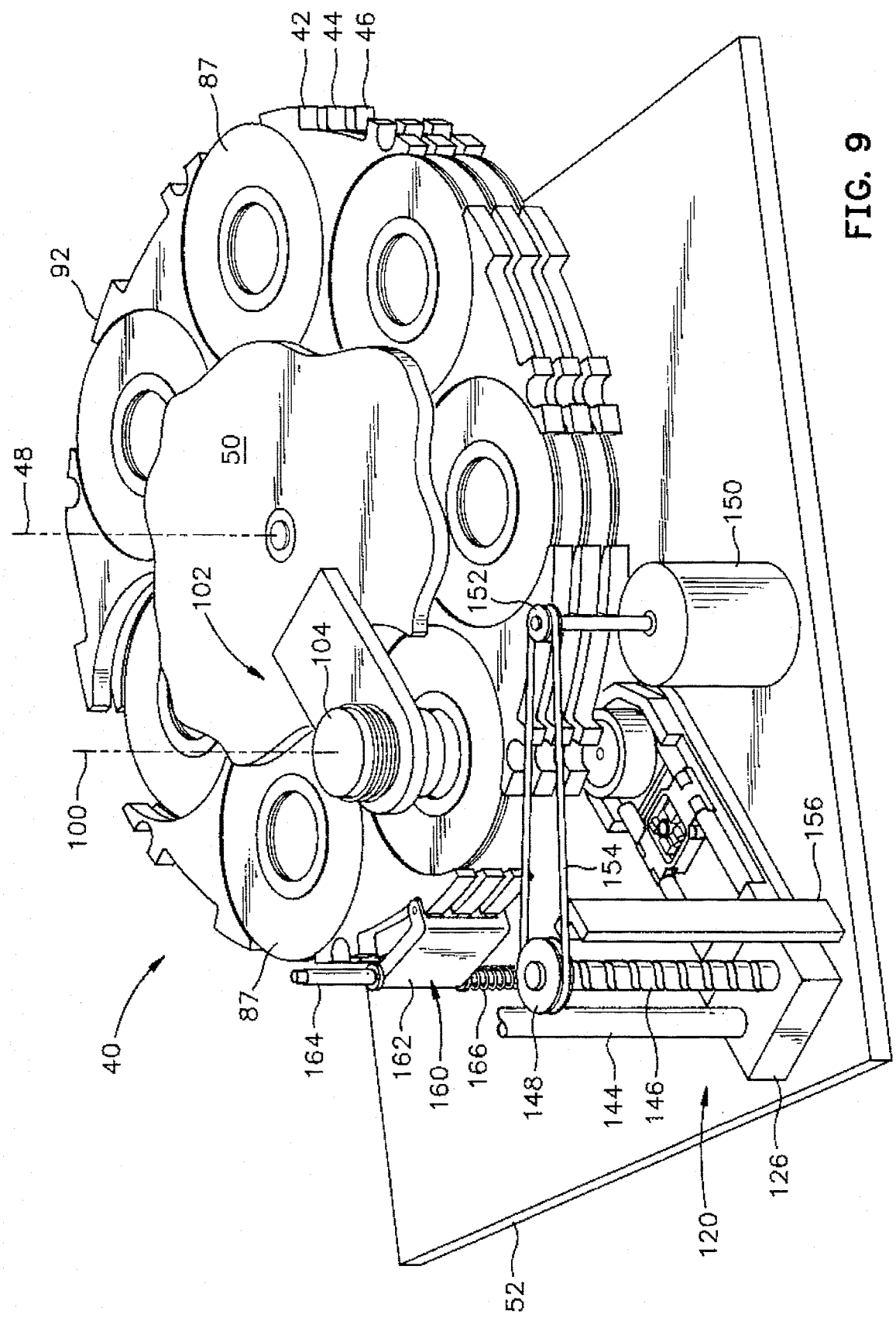
FIG. 9 is the same as FIG. 8 except the bottom carousel has been rotated clockwise to release the detent.

FIG. 7 is the same as FIG. 1 except a pair of disks has been loaded into each receptacle of each carousel and the bottom carousel 46 has been rotated counterclockwise to cam open the detent 160. When this is accomplished, the carousels 42 and 44 are unlocked from the detent and can be selectively rotated to place any desired receptacle along the transport axis 100. It should be understood that any of the carousels can be utilized to cam open the detent 160 and that the carousel employed for this purpose should not be the carousel involved in delivering disks to the transport axis 100. FIG. 8 is the same as FIG. 7 except the top carousel 42 has been rotated clockwise to place a pair of disks along the transport axis 100. It should be understood that when the bottom carousel 46 implements the unlocking operation of the detent 160, that any of the receptacles of either of the carousels 42 and 44 can be rotated to the transport axis 100. FIG. 9 is the same as FIG. 8 except the bottom carousel 46 has been rotated clockwise to release the detent 160 and the top carousel 42 has been rotated until the detent stops the carousel 42 in its desired aligned position.

Figure 10:
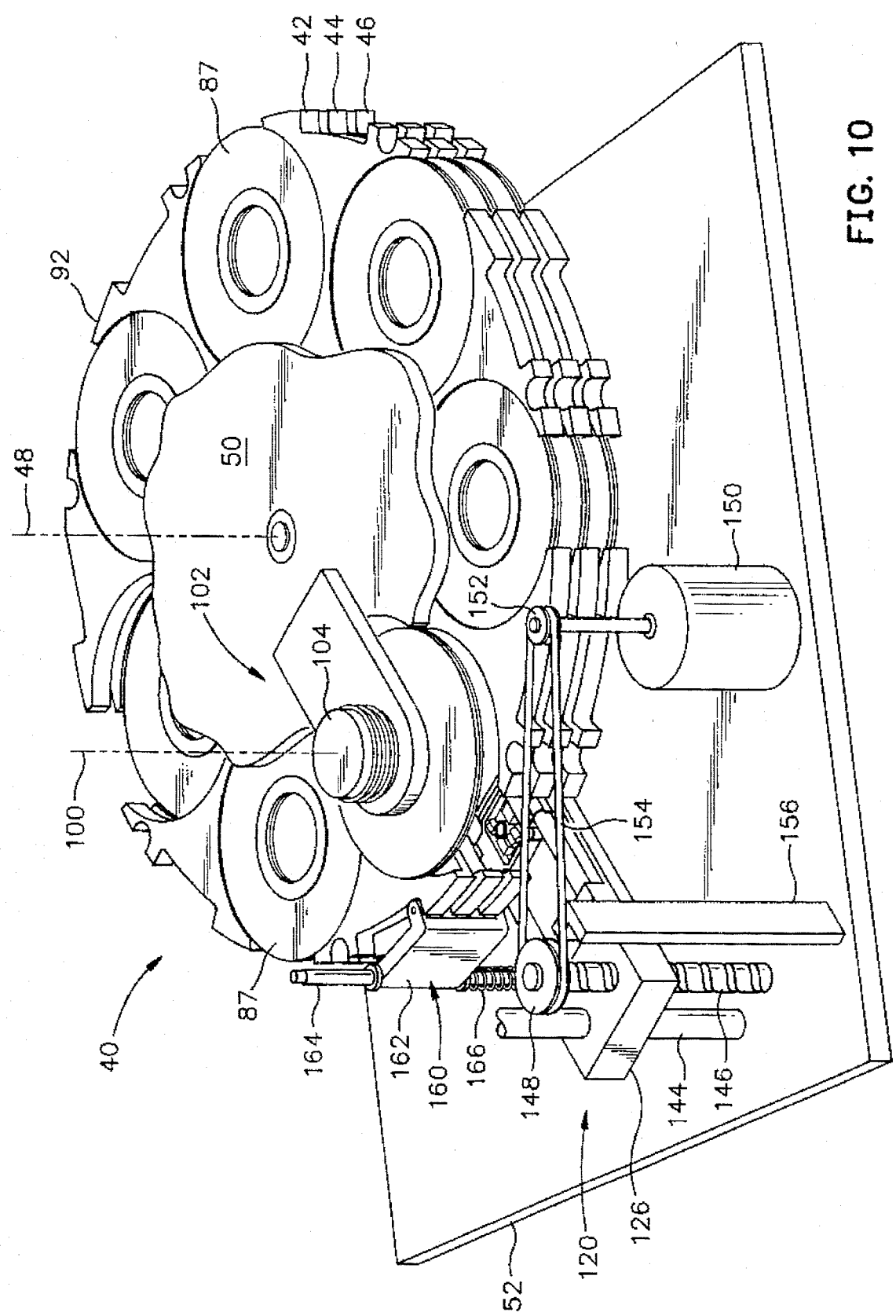
FIG. 10 is the same as FIG. 9 except the transport/drive device has transported both disks to the top disk chucking device.
Figure 11:
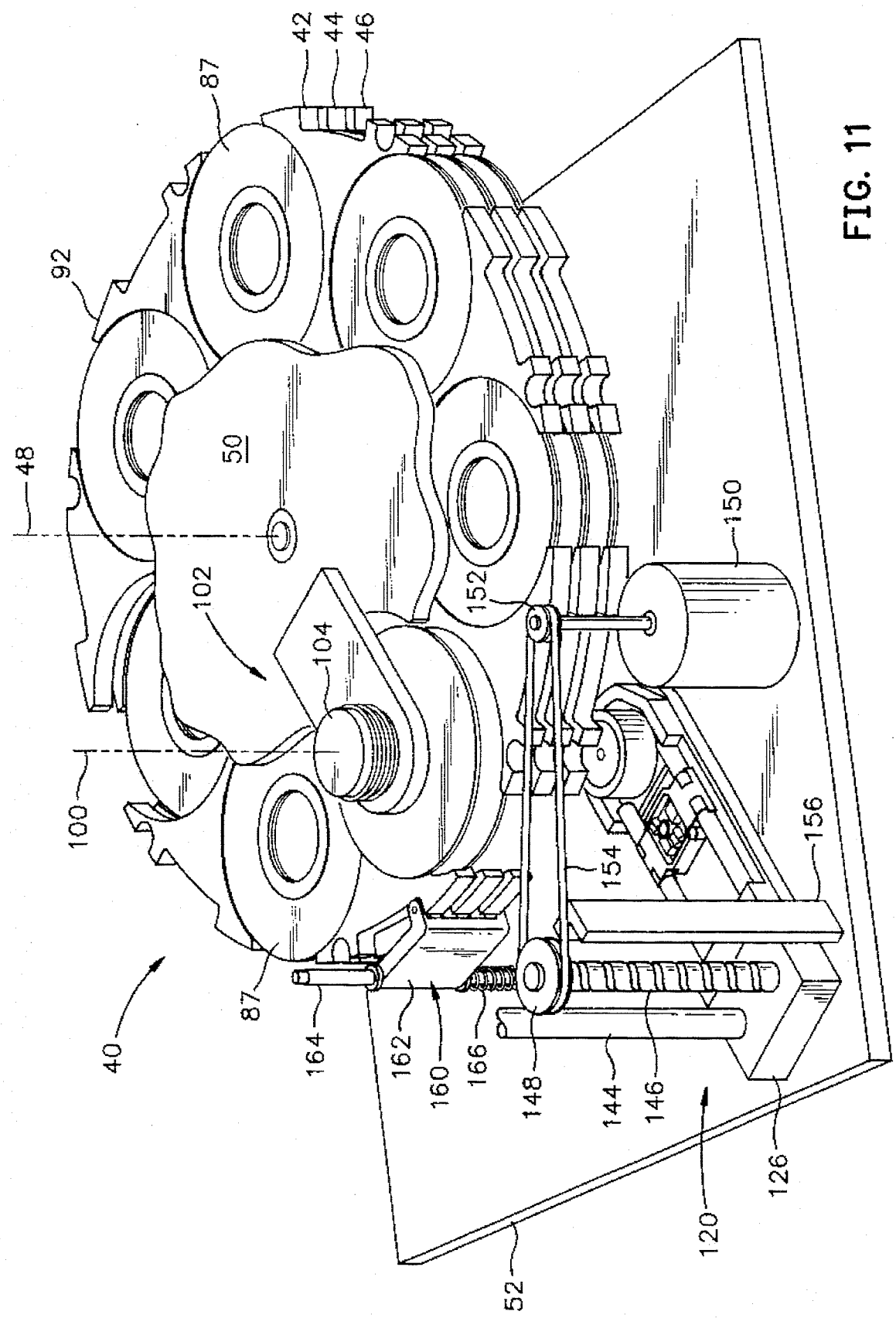
FIG. 11 is the same as FIG. 10 except the top disk is chucked by the disk chucking device and the bottom disk is lowered by the transport/drive device back to its original receptacle.

FIG. 10 is the same as FIG. 9 except the transport device 120 has transported both disks from the receptacle to the top spindle 102. When this occurs, the top of the spindle 128 on the transport device, as seen in FIG. 4, engages the bottom of the spindle 104 of the disk chucking device 102 shown in FIG. 5. Engagement of the transport device 120 with the disk chucking device 102 is illustrated in FIG. 6. When this occurs, the disk chucking device is energized to retain the top disk, leaving the bottom disk on the spindle 128 of the transport device as shown in FIG. 6. FIG. 11 is the same as FIG. 10 except the bottom disk has been lowered by the transport device to place it back in the receptacle of the top carousel 42 while the top disk is retained by the disk chucking apparatus 102.

Figure 12:
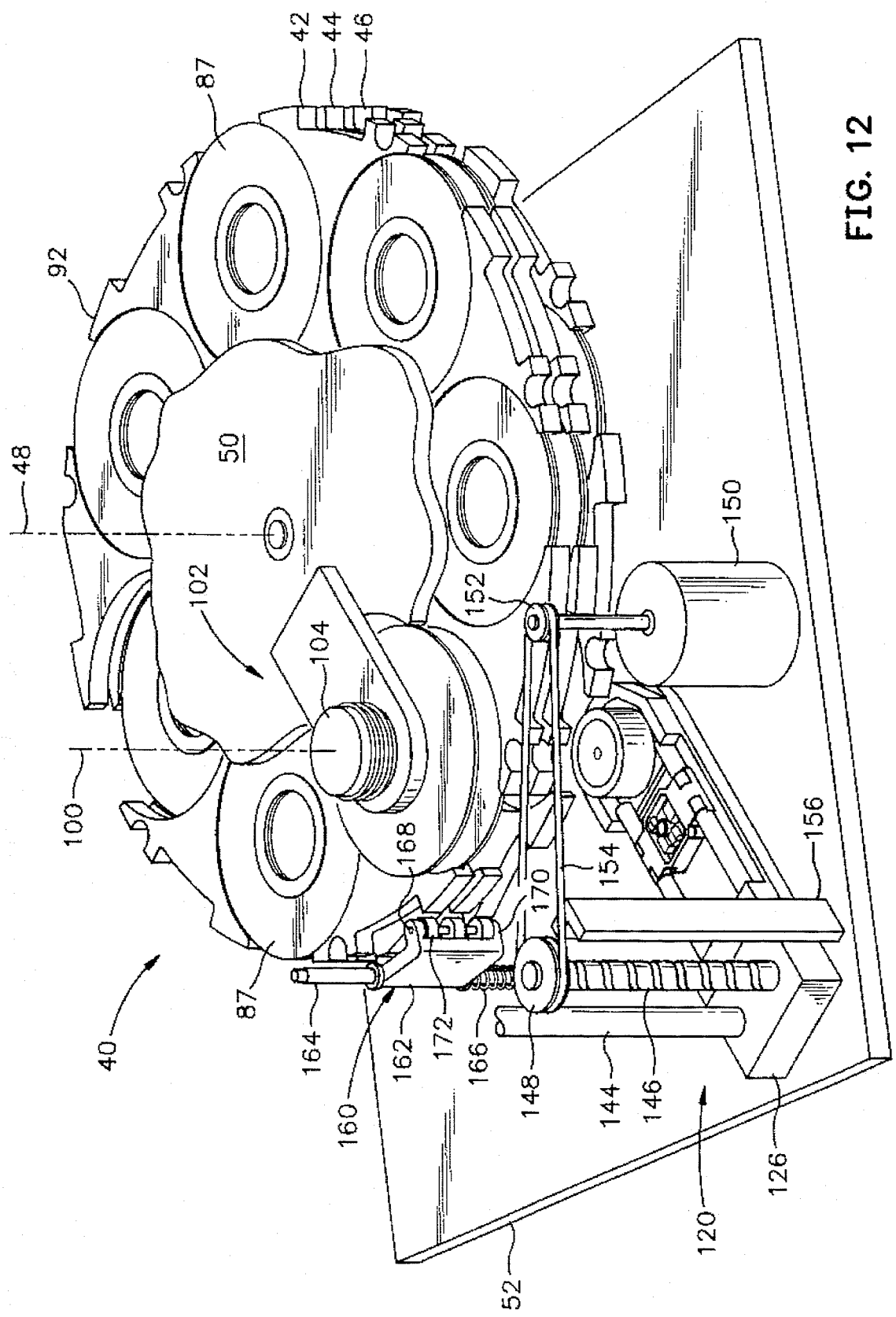
FIG. 12 is the same as FIG. 11 except the bottom carousel is rotated counterclockwise to cam open the detent.
Figure 13:
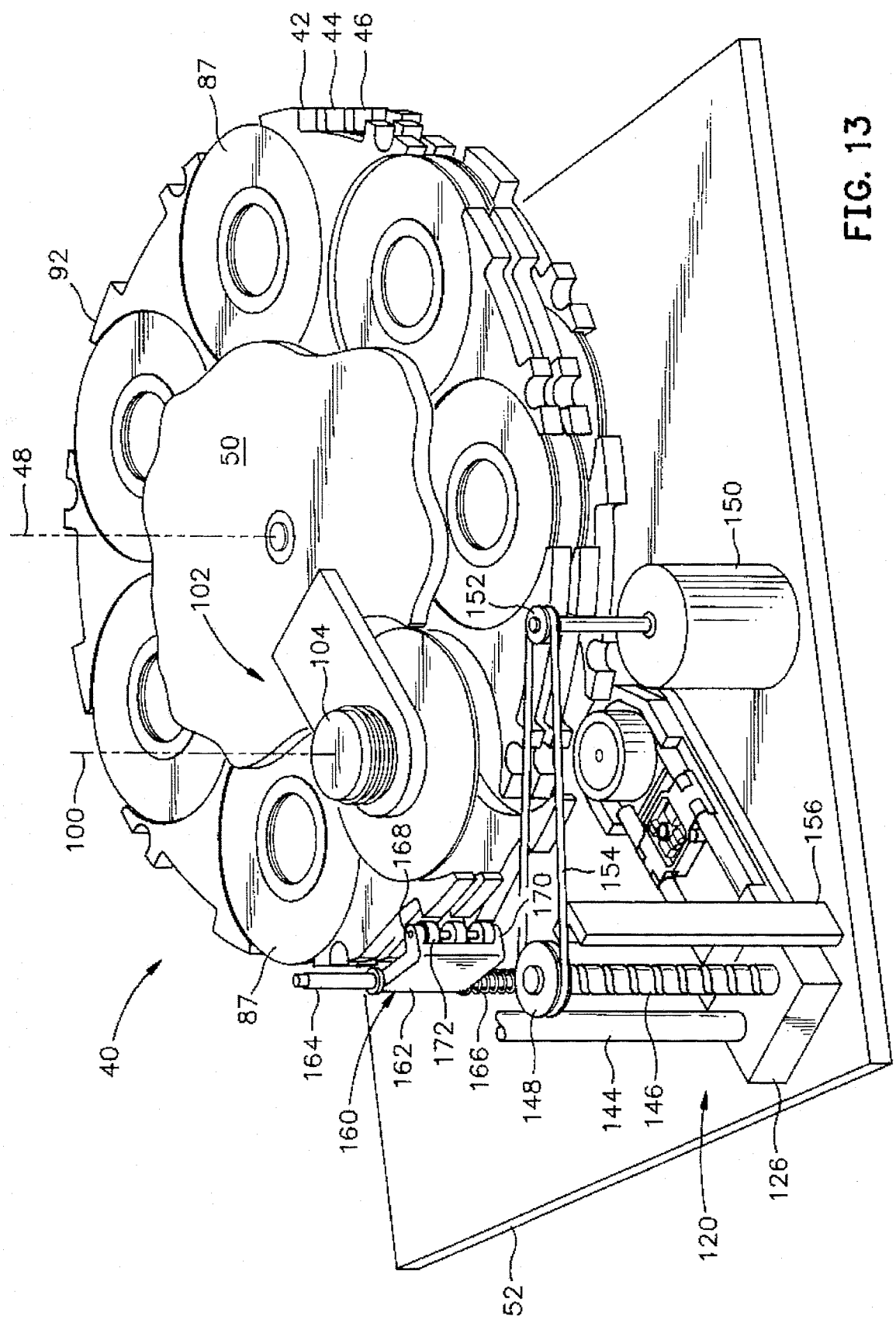
FIG. 13 is the same as FIG. 12 except the top carousel is rotated counterclockwise back to its original position.
Figure 14:
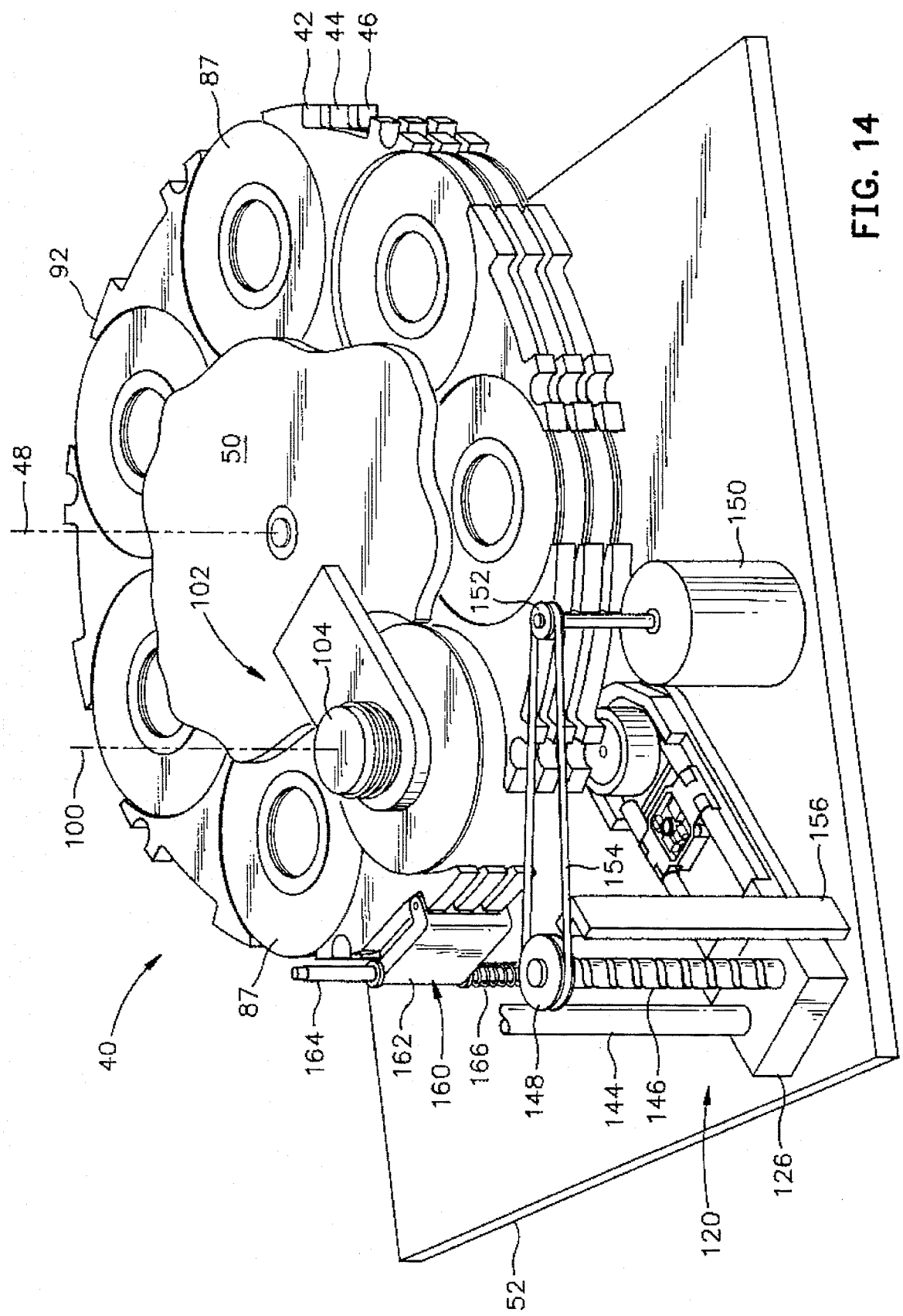
FIG. 14 is the same as FIG. 13 except the bottom carousel is rotated clockwise to release the detent.
Figure 15:
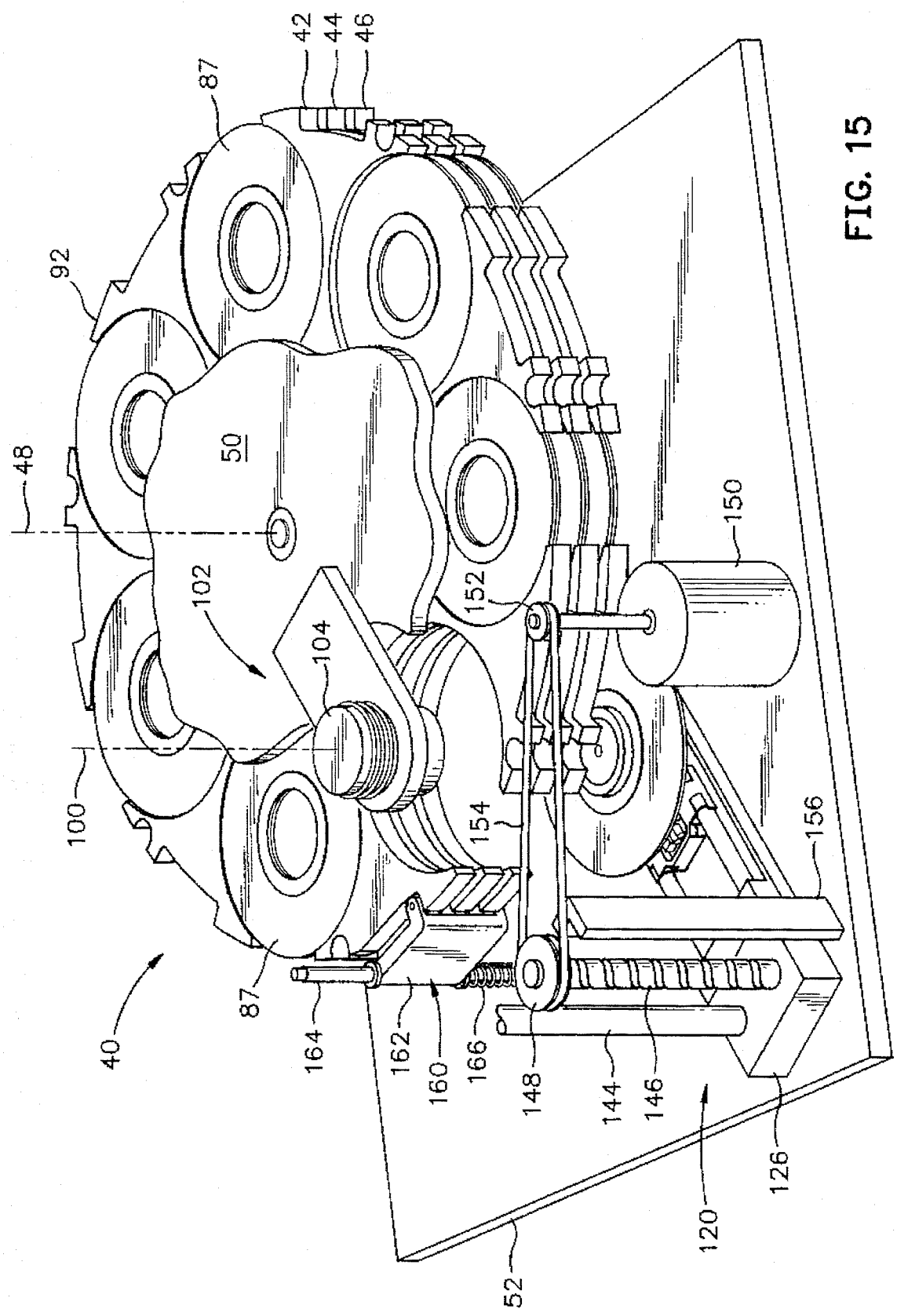
FIG. 15 is the same as FIG. 14 except the transport/drive device has been elevated to the top spindle, the disk on the top spindle has been released to the transport/drive device, and the transport/drive device has been lowered to a position for processing the disk.

FIG. 12 is the same as FIG. 11 except the bottom carousel 46 has been rotated counterclockwise once again to cam open the detent 160 and unlock it from all of the recesses of the other two carousels 42 and 44. FIG. 13 is the same as FIG. 12 except the top carousel 42 has been rotated back to its original position. FIG. 14 is the same as FIG. 13 except the bottom carousel has been rotated clockwise to release the detent 160 with all of the carousels stopped with their large circular cutouts 88 aligned with respect to one another. FIG. 15 is the same as FIG. 14 except the transport device 120 has returned to the disk chucking device 102, the disk chucking device has released the top disk to the transport device, and the transport device has been lowered, at which time its spindle 128 can rotate the disk for reading by the optical reader 130 shown in FIG. 4.

After processing the disk, the above procedure is substantially reversed. The transport device 120 returns the processed disk to the disk chucking device 102 and is then lowered awaiting the next step. The top carousel is then rotated so that the original receptacle is aligned with the transport axis 100 and the transport device 120 is raised to lift the disk off of this receptacle up to the disk chucking device 102, where the top disk is released. The transport device 120 then lowers both disks back to the original receptacle and one of the carousels 44 or 46 is rotated to cam open the detent 160. The top carousel 42 is then rotated back to its original position, after which the detent is released and the carousels are rotated clockwise until their cutouts are aligned.

The process just described enables a reading of the top disk. It should be understood that if it is desired to read the bottom disk there is no requirement for the transport device 120 to raise the disks to the disk chucking device 102, as shown in FIG. 10. Instead of raising these disks to the disk chucking device 102, the transport device would operate its spindle 128 so that the optical reader 130 would read the bottom side of the bottom disk with the top disk riding thereon. This explanation introduces various other embodiments which can be made according to the teachings of the present invention.

FIGS. 17–20 schematically illustrate other embodiments of the present invention. Each of these embodiments is operable with respect to a pair of recordable media disks, whether they be magnetic or optical. The recordable side of the disk is indicated by a tab. FIG. 17 is a schematic illustration of the embodiment of the invention described hereinabove. A pair of disks is processed with their recordable sides fading downwardly. The transport/drive device can read the bottom side of a disk. If the bottom disk is to be read, the top disk is left in place, whereas if the top disk is to be read, the bottom disk is removed as explained hereinabove while the top disk is retained by the disk chuck 102. Afterwards, the top disk is returned to the transport/drive device for processing. In FIG. 18, a pair of disks can be processed with their recording sides facing upwardly. A transport/spindle device can transport both disks to the drive and rotate them while the drive reads the top disk. If the bottom disk is to be read, the top disk can be chucked to the drive by an electromagnet, the transport/spindle device can be lowered, and the electromagnet can release the top disk to the original receptacle, after which it is rotated out of the way. The transport/spindle device can then raise the bottom disk for processing by the drive.

In FIG. 19, a pair of disks can be processed in which the top disk has a recording side facing upwardly and the bottom disk has a recording side facing downwardly. There is a transport/drive at the bottom and a drive at the top. With this arrangement, one of the disks does not have to be moved out of the way in order to process the other disk. When the receptacle brings a pair of disks into the transport axis 100, the transport/drive can read the bottom disk or raise both disks to the top drive, where the top disk can be processed. FIG. 20 is similar to FIG. 19 except each disk has top and bottom recordable media sides. With regard to the top side of the top disk and the bottom side of the bottom disk, the embodiment in FIG. 20 would operate the same as the embodiment in FIG. 19. However, if the bottom side of the top disk is to be read, the top disk must be chucked by the top drive and the transport/drive device must return the bottom disk to the receptacle so that it can be rotated out of the way. The transport/drive device then retrieves the top disk from the top drive and processes the bottom side of the top disk. If the top side of the bottom disk is to be processed, the process is similar to that explained for FIG. 18. The top disk is chucked by the top drive, the receptacle is brought into place so that the top disk can be dropped into the receptacle, and the receptacle rotates the top disk out of the way. Then the transport/drive device takes the bottom disk to the top drive where it can be processed.

Figure 21:
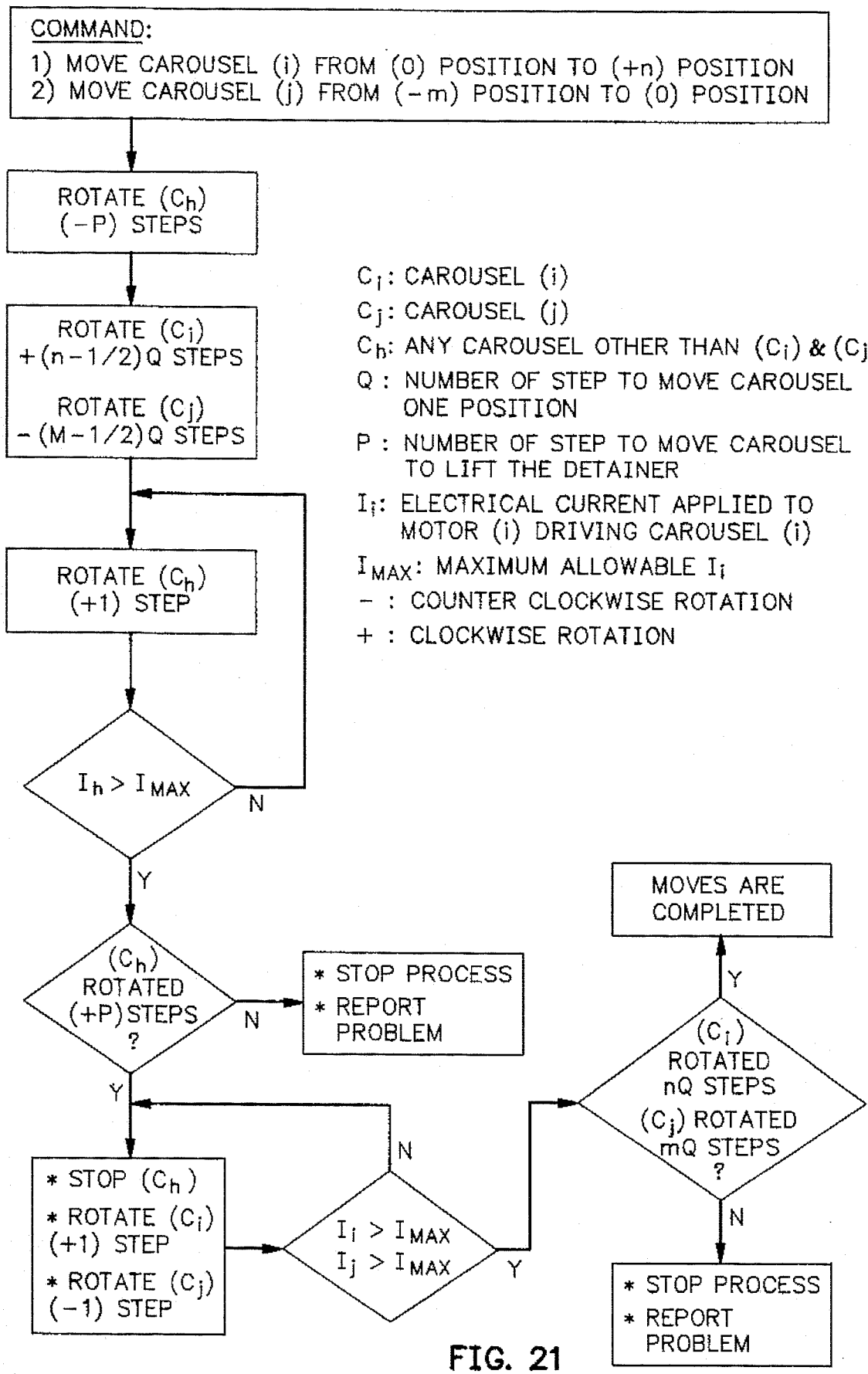
FIG. 21 is a flow diagram for the operation of the present invention.

FIG. 21 is an exemplary flow diagram for the operation of the motors of the carousel library 40. The assumption is made that a receptacle from one of the carousels is located along the transport axis 100 and must be moved out of the way. Commands then emanate to move a new carousel i from its zero position to a +n position and to move the old carousel j from a -n position to its original zero position. This will cause one of the carousels other than $C_i$ or $C_j$, such as $C_h$, to be moved counterclockwise in discrete steps which correspond to the markings sensed by the appropriate sensor 192, 194, and 196 in FIG. 3. The number P is the number of steps required to move the carousels $C_h$ to unlock the detent 160. Next the carousel $C_i$ is rotated clockwise to rotate it (n-½)Q, where Q is the number of steps to move the carousel one position from one receptacle location to an adjacent receptacle location. The ½ ensures that the detent mechanism 160 is located between the upstream and downstream stops 178 and 180 of a recess 174, as seen in FIG. 2. The carousel $C_j$ is rotated counterclockwise back to its original position (n-½)Q. Next, the detent unlocking carousel $C_h$ is rotated clockwise one step at a time until the current $I_h$ of the respective motor is greater than some maximum current $I_{max}$. When the answer is no, the motor keeps stepping the carousel $C_h$ until $I_h$ is greater than $I_{max}$, at which time the question is asked whether the carousel $C_h$ has been rotated clockwise a required number of steps which is equal to P. If the answer is no, then there is a problem and the entire process is stopped. If the answer is yes, the carousel $C_h$ is stopped and the carousel $C_i$ is rotated clockwise one step at a time and the carousel $C_j$ is rotated counterclockwise one step at a time until their currents $I_i$ and $I_j$ are greater than respective current values $I_{max}$. This process then continues until the answer is yes, at which time the inquiry is made whether the carousel $C_i$ has rotated nQ steps and whether the carousel $C_j$ has been rotated nQ steps. If either of these answers is no, the process is stopped since there is a problem. If both of these answers are yes, the moves have been completed.

Although the invention has been described in terms of the specific embodiment, the inventor contemplates modifications and substitutions to various components of the invention would occur to the person of ordinary skill in the art, and therefore, would be in the scope of the invention, which is to be limited only the claims which follow.

We claim:

1. A library for storing a plurality of recordable media disks comprising:

a frame having a central axis and a transport axis which are parallel with respect to one another;

a disk retainer mounted on the frame and located along the transport axis for retaining only one of a pair of disks;

a plurality of vertically stacked carousels mounted on the frame and independently rotatable about the central axis for moving said pair of disks from a remote location to an access location which is located along the transport axis;

each carousel having a plurality of receptacles which are angularly spaced from one another about the central axis, each receptacle being capable of supporting said pair of disks;

a disk transport mounted on the frame for receiving said pair of disks at the access location and for transporting said pair of disks along the transport axis to the disk retainer where one of the disks can be retained by the disk retainer and the other disk can remain with the disk transport;

each of the carousels having a plurality of cutouts for providing passage for the disk transport;

each carousel having a substantially circular rim;

each circular rim having recesses;

a spring biased detent engageable with each carousel within the recesses for positioning the carousels so that disks are accessed to the disk transport; and each carousel having a cam in one of its recesses for disengaging the detent from the recesses.

2. A library as claimed in claim 1 including:

each recess having a stop tier engaging the detent to stop the carousels in positions with their cutouts aligned.

3. A library as claimed in claim 2 including:

the rim having a series of indentations; and each indentation being adjacent a respective recess for receiving the detent means and preventing the detent from engaging one or more disks in a receptacle.

4. A library as claimed in claim 3 including:

drive means mounted on the disk transport for reading from and writing to one of said disks.

5. A library as claimed in claim 4 including:

the disk retainer being located above the disk transport and including an electromagnet for retaining one of said disks.

6. A library as claimed in claim 5 including:

pairs of disks mounted in at least some of the receptacles;

each of the disks having a recordable side which faces downwardly in the respective receptacle; and each disk having a central opening and a ferromagnetic portion which is adjacent the central opening.

7. A library as claimed in claim 6 including:

means for rotating one of the carousels until the detent rides up the ramp to the rim;

means for rotating a second one of the carousels until a selected one of the receptacles is located along the transport axis; and means for rotating a third one of the carousels until the carousel cutout is located along the transport axis.

8. A library as claimed in claim 7 including:

some of the cutouts of a carousel being a small cutout in each receptacle and another cutout being a large cutout in the carousel between a pair of receptacles; and the small cutouts being sized to allow passage of the disk transport and the large cutout being sized to allow passage of the disk transport and passage of the disks.

9. A double storage multi-carousel library for storing recordable media disks comprising:

a plurality of vertically stacked carousels mounted to a base for independent rotation about a vertically extending central axis;

each carousel having a plurality of receptacles which are angularly spaced from one another about the central axis, each receptacle being capable of storing a pair of disks;

each carousel having a cutout which is located between a pair of receptacles and each receptacle having a cutout;

each carousel cutout being capable of alignment along a transport axis which is parallel to the central axis for allowing a disk to be transported vertically along the transport axis;

disk chucking means mounted to the base for receiving and releasably retaining one of the disks when moved vertically along the transport axis;

disk transport means mounted to the base and movable vertically along the transport axis and passable through any carousel cutout and/or receptacle cutout for removing one of the disks from a receptacle when the receptacle is aligned with the transport axis and for transporting the removed disk to the disk chucking means;

drive means mounted to the base for processing the disks when located along the transport axis;

each carousel having a circular rim which circumscribes the central axis;

each circular rim having a plurality of recesses, each recess corresponding to a respective receptacle;

each recess having an inward surface which is bounded in part by an upstream radially extending stop;

a detent mounted to the base and movable into and out of each recess, the detent being engageable with the upstream stop of each recess;

an engagement of the detent with an upstream stop of a recess of each carousel stopping all of the carousels with all or any combination of carousel cutouts and receptacle cutouts aligned along the transport axis;

means connected to the detent for biasing the detent toward the rims of the carousels so that when the detent is in a recess it is in a locked position; and one of the recesses of each carousel having a camming ramp which slopes from the upstream stop downstream to the rim so that when any carousel is rotated in an upstream direction the detent rides up the ramp to the rim to an unlocked position with respect to all of the recesses of all of the carousels, whereby any one of the carousels can be rotated to cause its camming ramp to cam the detent to its rim so that the detent is unlocked from all of the recesses of the remaining carousels.

10. A library as claimed in claim 9 including:

the detent being spring biased.

11. A library as claimed in claim 10 including:

means for rotating one of the carousels until the detent rides up the ramp to the rim; and means for rotating a second one of the carousels until a selected one of the receptacles is located along the transport axis.

12. A library as claimed in claim 11 including:

means for rotating a third one of the carousels until the carousel cutout is located along the transport axis.

13. A library as claimed in claim 12 including:

the drive means being mounted on the transport means; and the drive means including:

a spindle for receiving and rotating one of said disks; and means for reading from and writing to said disk when the disk is rotated by the spindle.

14. A library as claimed in claim 13 including:

the disk chucking means being fixed to the base above the disk transport means.

15. A library as claimed in claim 14 including:

the disk chucking means includes a spindle for receiving a disk and an electromagnet for retaining and releasing the disk.

16. A library as claimed in claim 15 including:

pairs of disks stored in at least some of the receptacles of the library.

17. A library as claimed in claim 16 including:

each carousel cutout being semi-circular with a peripheral opening at the rim;

each receptacle cutout having a peripheral opening at the rim; and the peripheral openings of the carousel cutouts and the peripheral openings of the receptacle cutouts being sized to allow vertical passage of the disk transport means.

18. A library as claimed in claim 17 including:

the widths of the carousel cutout peripheral openings and the widths of the receptacle cutout peripheral openings being substantially equal.

19. A library as claimed in claim 18 including:

each of the carousel cutouts and each of the receptacle cutouts extending radially inwardly beyond centers of the receptacles.

20. A multi-carousel library for storing recordable media disks comprising:

a plurality of vertically stacked carousels mounted to a base for independent rotation about a vertically extending central axis;

each carousel having a plurality of receptacles which are angularly spaced from one another about the central axis, each receptacle being capable of storing one or more disks;

each carousel having a cutout which is located between a pair of receptacles and each receptacle having a cutout;

each carousel cutout being capable of alignment along a transport axis which is parallel to the central axis for allowing said disk to be transported vertically along the transport axis;

disk chucking means mounted to the base for receiving and releasably retaining said disk when moved vertically along the transport axis;

disk transport means mounted to the base and movable vertically along the transport axis and passable through any carousel cutout and/or receptacle cutout for removing said disk from a receptacle when the receptacle is aligned with the transport axis and for transporting the removed disk to the disk chucking means;

drive means mounted to the base for processing said disk when located along the transport axis;

each carousel having a circular rim which circumscribes the central axis;

each circular rim having a plurality of recesses, each recess corresponding to a respective receptacle;

each recess having an inward surface which is bounded in part by an upstream radially extending stop;

a detent mounted to the base and movable into and out of each recess, the detent being engageable with the upstream stop of each recess;

an engagement of the detent with an upstream stop of a recess of each carousel stopping all of the carousels with all or any combination of carousel cutouts and receptacle cutouts aligned along the transport axis;

means connected to the detent for biasing the detent toward the rims of the carousels is so that when the detent is in a recess it is in a locked position; and one of the recesses of each carousel having a camming ramp which slopes from the upstream stop downstream to the rim so that when any carousel is rotated in an upstream direction the detent rides up the ramp to the rim to an unlocked position with respect to all of the recesses of all of the carousels;

whereby any one of the carousels can be rotated to cause its camming ramp to cam the detent to its rim so that the detent is unlocked from all of the recesses of the remaining carousels.

21. A library as claimed in claim 20 including:

the detent being spring biased.

22. A library as claimed in claim 21 including:

means for rotating one of the carousels until the detent rides up the ramp to the rim; and means for rotating a second one of the carousels until a selected one of the receptacles is located along the transport axis.

23. A library as claimed in claim 22 including:

means for rotating a third one of the carousels until the carousel cutout is located along the transport axis.

24. A library as claimed in claim 23 including:

the drive means being mounted on the transport means; and the drive means including:
a spindle for receiving and rotating said disk; and
means for reading and writing the disk when the disk is rotated by the spindle.

25. A library as claimed in claim 24 including:

the disk chucking means being fixed to the base above the disk transport means.

26. A library as claimed in claim 25 including:

the disk chucking means includes a spindle for receiving a disk and an electromagnet for retaining and releasing the disk.

27. A library as claimed in claim 26 including:

pairs of disks stored in at least some of the receptacles of the library.

28. A library as claimed in claim 27 including:

each carousel cutout being semi-circular with a peripheral opening at the rim;

each receptacle cutout having a peripheral opening at the rim; and the peripheral openings of the carousel cutouts and the peripheral openings of the receptacle cutouts being sized to allow vertical passage of the disk transport means.

29. A library as claimed in claim 28 including:

the widths of the carousel cutout peripheral openings and the widths of the receptacle cutout peripheral openings being substantially equal.

30. A library as claimed in claim 29 including:

each of the carousel cutouts and each of the receptacle cutouts extending radially inwardly beyond centers of the receptacles.

* * * * *

UNITED STATES PATENT AND TRADEMARK OFFICE
CERTIFICATE OF CORRECTION

PATENT NO. : 5,541,897
DATED : July 30, 1996
INVENTOR(S) : Baca et al.

It is certified that error appears in the above-indentified patent and that said Letters Patent is hereby corrected as shown below:

Column 10, line 28, delete "tier" and substitute --for--;

Column 13, line 16, delete ";" and substitute --,--.

Signed and Sealed this

Eighteenth Day of February, 1997

Attest:

BRUCE LEHMAN

Attesting Officer     Commissioner of Patents and Trademarks